(12) United States Patent
Nowak

(10) Patent No.: US 7,128,851 B2
(45) Date of Patent: Oct. 31, 2006

(54) METHOD OF REMOVING SCRATCHES FROM A COMPACT DISC

(76) Inventor: Julius J. Nowak, 38746 Hidden La., Clinton Township, MI (US) 48036

( * ) Notice: Subject to any disclaimer, the term of this patent is extended or adjusted under 35 U.S.C. 154(b) by 0 days.

(21) Appl. No.: 10/964,141

(22) Filed: Oct. 12, 2004

(65) Prior Publication Data

US 2005/0116368 A1    Jun. 2, 2005

Related U.S. Application Data

(60) Provisional application No. 60/510,361, filed on Oct. 10, 2003.

(51) Int. Cl.
*B29D 11/00* (2006.01)

(52) U.S. Cl. ............... 264/1.33; 264/2.1; 264/2.7; 264/345; 264/40.6; 425/143; 425/446; 425/810

(58) Field of Classification Search ............... 264/1.1, 264/2.1, 2.7, 1.33, 40.1, 40.6, 345; 425/445, 425/446, 810, 143
See application file for complete search history.

(56) References Cited

U.S. PATENT DOCUMENTS 6,277,309 B1 *   8/2001   Campbell .................. 264/1.33
2003/0145941 A1 * 8/2003   Hanzawa ................. 156/275.7

* cited by examiner

*Primary Examiner*—Mathieu D. Vargot
(74) *Attorney, Agent, or Firm*—The Weintraub Group, PLC

(57) ABSTRACT

An apparatus and method is disclosed for repairing and removing scratches from an optically-read disc, e. g., compact discs (often called "CD's" or "DVD's" such that when refurbished, an optical reader, which uses a laser to read digital information stored on the disc, can read the digital information on the disc without the optical distortion caused by a scratch and like surface imperfection.

12 Claims, 2 Drawing Sheets

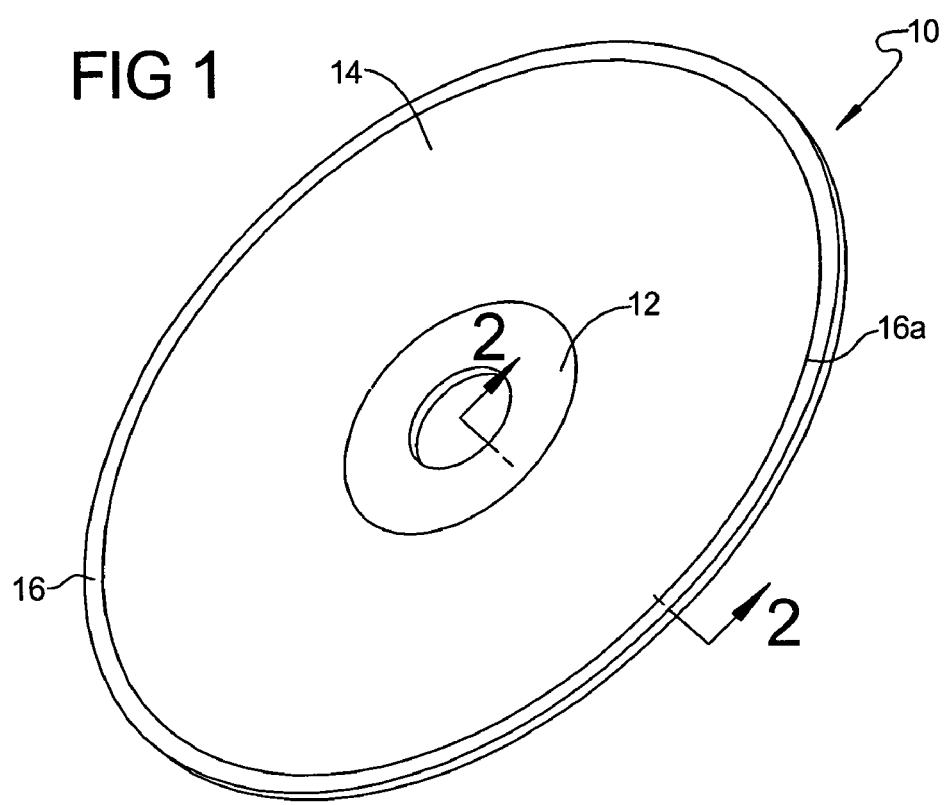
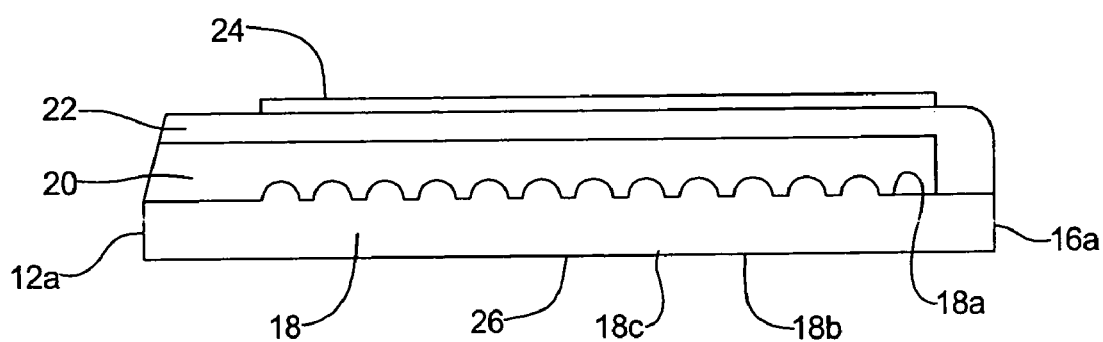

METHOD OF REMOVING SCRATCHES FROM A COMPACT DISC

CROSS-REFERENCE TO RELATED APPLICATION

This application is a completion application of co-pending U.S. Provisional Patent Application Ser. No. 60/510,361, filed Oct. 10, 2003, the disclosure of which is hereby incorporated by reference in its entirety.

BACKGROUND OF THE INVENTION

1. Field of the Invention

This invention relates to a method of repairing and removing scratches from an optically-read disc, e. g., compact discs (often called "CD's" or "DVD's"). More specifically, this invention provides a method and apparatus for refurbishing the surface of a disc such that when refurbished, an optical reader, which uses a laser to read digital information stored on the disc, can read the digital information on the disc without the optical distortion caused by a scratch and like surface imperfection.

2. Description of Related Art

Optically read digital storage and play-back media, such as laser discs, compact audio discs, digital video discs, CD-ROM's (i.e., read only memory) and others, hereinafter collectively referred to as compact discs (i.e., "CD's"), are essentially various layers of plastic covering which protect a reflective foil coating. The metallic foil coating may be configured to store a wide variety and quantity of digital information which may be optically read through the use of one or more laser beams or other light amplified beams.

The compact disc, as currently manufactured, is round and comprised of a synthetic material (e.g., polycarbonate), with a typical diameter of the disc being about 4¾ inches and a typical thickness being about 1/16 inches. The disc size varies slightly as to CD's and DVD's. The disc typically has a center aperture approximately ⅝ inches in diameter for receiving a centering spindle in a playback apparatus. Digitally recorded material typically extends on one or both sides of the disc from a data band extending about ¾ inches from the center aperture outward to within about ¼ inch of the peripheral end of the disc. A bearing or contact area may extend on one or both sides, in approximately the same dimensions, for bearing on a playback apparatus, which spins the disc at high speed.

The digital information is contained on a relatively thin layer of metallic material sandwiched in a protective layer of the synthetic material (e.g., the polycarbonate). A laser within the playback apparatus reads the digital information through the plastic layer. If the plastic layer becomes scratched, stained or pitted, the laser light will distort and not accurately read the digital information.

Unless the disc can in some way be refurbished or reconditioned, the disc would have to be thrown away. Due to the high cost of a digital disc, a need exists for an inexpensive means for refurbishing and/or reconditioning the scratched protective surface of the disc.

One known process for reconditioning digital recording discs involves a motorized apparatus having a buffing surface that abrades the protective surfacein a generally uniform manner across the surface area of the disc. While this method may effectively repair the protective surface of some discs, it can leave fine abrasions on other discs, which abrasions can fall into alignment with the spiral data track or otherwise affect the quality of the treated disc so that playability is not restored.

Also, reconditioning by the use of a buffer may leave a sudden or stepwise change between the thickness of an unconditioned portion of the protective surface and a reconditioned portion of the protective surface. A laser beam passing through this sharp demarcation may be undesirably bent or scattered so that the underlying data track or tracks cannot be detected by the playback system.

As such, the buffing technique selectively abrades one area more another area, thus requiring fine manipulation of the buffer relative to the CD. This is very labor intensive and the reconditioning depends on the skill of the worker performing the reconditioning.

Another approach for reconditioning scratched plastic surfaces involves filling the scratch or void with a mixture having the same refractive index. As understood, this method has been used with limited success in glazed canopies of helicopters, but not with CD's.

U.S. Pat. No. 6,277,309, issued Aug. 21, 2001 to Campbell, discloses a process and device for resurfacing damaged compact discs by melting a thin layer of the optical surface of the compact disc so that it reflows and fills any scratches or other imperfections. Campbell passes the CD beneath a burner that generates flames, with the flames therefrom operating to melt a very thin layer of the layer forming the protective optical surface above the foil. This melted layer then flows into the scratches formed in the optical surface and creates a smooth reconditioned surface.

Because uniform distribution of the heat is essential, Campbell suggests that the burner and the disc may be rotated relative to one another.

The use of a flame is believed to possibly degrade the optical surface or simply burn the disc up. At the least, the Campbell solution is labor intensive and requires an experienced worker to position and adjust the flame relative to the disc. At the worst, the Campbell approach will destroy the disc sought to be reconditioned.

A primary object and advantage of this invention is the provision of a cost effective method and apparatus that overcomes the disadvantages of the prior art.

A further object and advantage of this invention of this invention is the provision of a method and apparatus that restores a compact disc, as close as possible, to its original or new condition.

Another object and advantage of this invention is the provision of a method and apparatus, which may be repeated several times without wearing away, or otherwise degrading, the optical surface of the disc that is to be restored.

Yet a further object and advantage of this invention is the provision of a method and apparatus for refurbishing the optical quality of a compact disc that is inexpensive and capable of being performed by less skilled workers.

Still a further object and advantage of this invention is the provision of a method and apparatus for restoring the optical surface of a compact disc that is repeatable with and yields uniformity of results

SUMMARY OF THE INVENTION

The present invention achieves the above objects by providing a method and apparatus for rendering a CD that has been rendered unreadable or only partially readable due to the presence of one or more surface imperfections on the play surface, but capable of being restore and rendered readable by repairing and/or refurbishing the scratched play surface of the CD.

The present invention is directed to a system for removing scratches and other imperfections from the optical surface of an optically read compact disc, comprising, in combination: a rotatable support table, said support table comprising a support surface positioned in substantially a first plane and formed with a disc cavity sized to receive and expose the optical surface of said compact disc, means for rotating the support table, means for heating the top layer of said exposed optical surface above its melting point, thereby reflowing the material of said top layer so that said scratches and other imperfections refill with material be removed, said means for heating comprising a radiant heat source, a housing enclosing the heat source and having a discharge outlet for discharging heated air from the heat source, and means for forcing air across the heat source and from said discharge outlet, and means for positioning said discharge outlet and disc in fixed axially spaced relation to one another and for substantially simultaneously rotating the compact disc in the support table and moving the heat source axially back and forth across the optical surface of said disc and radially relative to the compact disc positioned in the disc cavity.

According to one aspect hereof, the present invention is directed to an apparatus for removing scratches from a compact disc having a central area, a circular outer edge and an optically read scratched surface of synthetic plastic material therebetween and having an annealing temperature, said apparatus comprising: (a) a support for supporting the disc in a manner that the optically scratched surface is exposed and faces in a first direction, (b) a convection heater for heating and forcing air in said first direction and at said scratched surface, said convection heater being capable of providing heated air in excess of the annealing temperature of said synthetic material, (c) guide means for supporting and guiding said convection heater in fixed spaced relation above and across at least a portion of said scratched surface, (d) drive means for moving and selectively positioning said convection heater back and forth across the scratched surface and between the center and outer edge of the compact disc, (e) rotation means for rotating said compact disc, and (f) control means for substantially simultaneously controlling said convection heater, said drive means and said rotation means, and wherein said control means regulates the amount of heat supplied from the heater, the position of the heated air flow relative to the scratched surface of the compact disc, and the duration of time that the scratched surface is exposed to heat, to ensure that a predetermined layer of the exposed scratched surface is uniformly heated and melted.

In operation, the scratched surface of the disc is maintained in a plane generally perpendicular to the first direction of the heated air flow.

Preferably, the compact disc is rotated relative the heat source, although one or both may be rotated relative to one another. Further, the convection heater is superposed above the exposed surface and is moved axially back and forth relative to a radius of the compact disc, wherein the scratched layer of the optical surface is exposed to a controlled amount of heat and melted as the disc is rotated.

Further, the compact disc and the convection heater are enclosed within in a thermally insulated heat chamber (or oven). Desirably, this enables the reconditioner to maintain an accurate control over the temperature to which the compact disc is subjected, wherein to ensure that the scratched layer of the optical surface is exposed to a temperature that exceeds the annealing temperature but does not completely melt the optical layer of the compact disc being reconditioned.

This invention is also directed to a method for removing scratches and other imperfections from the optical surface of an optically read compact disc, wherein said optical surface of said compact disc includes laser penetrable plastic material, comprising: (a) mounting the compact disc in a disc receiving cavity, said mounting positioning the disc in a first plane and exposing the optical surface, (b) positioning a convective heat source in spaced relation above said optical surface, said heat source including a heater capable of generating a heat sufficient to heat the top layer of said optical surface above its melting point, thereby reflowing the material of said top layer so that said optical surface is leveled by the reflow filling of said scratches and other imperfections, and (c) substantially simultaneously: (1) heating the heater to a temperature above the melting temperature of the optical surface, (2) forcing air across the heater and towards said the exposed top layer of said optical surface, (3) moving the heat source in a second plane, spaced above said first plane, in a back and forth manner above and across at least a portion of the optical surface, and (4) rotating the compact disc in said disc cavity, the heated forced air heating the exposed top layer and causing the heated material to partially melt and reflow so that said scratches and other imperfections in the optical surface are filled.

Preferably, the heat source is constrained for back and forth axial movement above and across the compact disc, and radial movement relative to the center and outer circumference of the compact disc rotating therebelow.

Preferably, the disc is rotated at a rate such that centrifugal forces generated in such rotation and said heated air promote rapid and uniform leveling of the optical surface and filling of surface imperfections. Importantly, the exposed portion of the disc is uniformly exposed to the heated air during the time of rotation.

Following the exposure of the disc to convected air at the reflow temperature of the disc material, the disc is rotated for a further time, sufficient to gradually cool the optical material and the material to set The foregoing summary, as well as the following detailed description of preferred embodiments, will be better understood when read in conjunction with the accompanying drawings, wherein like numerals refer to like parts throughout. For illustrating the invention, there is shown in the drawings a preferred embodiment, it being understood, however, that the invention is not limited to the specific methods and instrumentalities disclosed. Other objects, features and advantages of the invention will become apparent in the following detailed description of the illustrative embodiments of the invention.

BRIEF DESCRIPTION OF THE DRAWINGS

FIG. 1 is an isometric view, in partial section, of an optically read compact disc.

FIG. 2 is a side elevation view, in section, taken along line 2—2 of the compact disc of FIG. 1, and a scratched protective coating thereof having need for reconditioning.

DESCRIPTION OF A PREFERRED EMBODIMENT OF THE INVENTION

Figure 3:
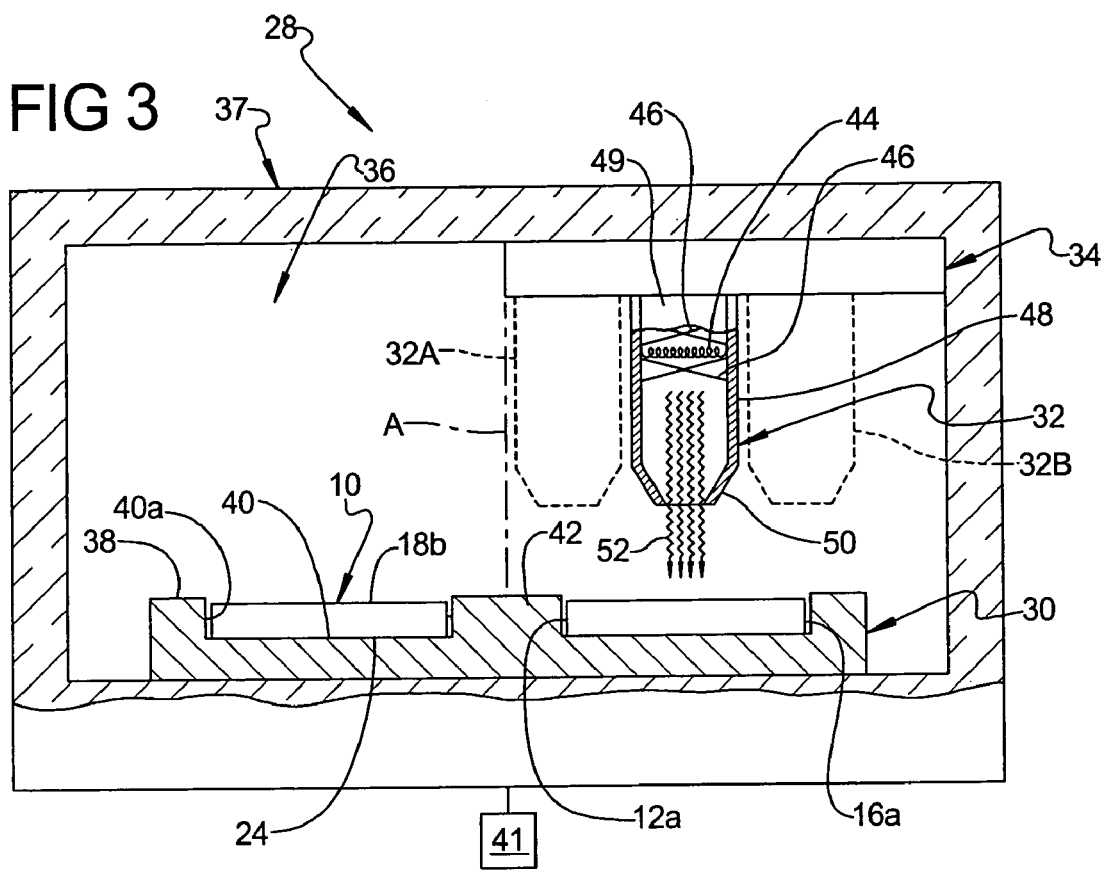
FIG. 3 illustrates a side view, in partial section, of a convective oven, and a turntable with a disc receiving cavity and convective heat source mounted within the convective oven.

As shown in the drawings for the purposes of illustration, the invention is embodied in an apparatus and a method for reconditioning the scratched protective (i.e., optical surface) of a compact disc (i.e. "CD"). As noted herein above, optically read digital storage and play-back media comprise laser discs, compact audio discs, DVD's (i.e., a digital video disc), CD-ROM's (i.e., a read only memory), CD-RW's (i.e., rewritable), CD-RAM's (i.e., a random access memory), DVD-RAM, and others, hereinafter collectively referred to as compact discs (i.e., "CD's").

As shown in FIG. 1, a compact disc or CD is illustrated by the number 10 and comprises various layers of plastic covering which protect a reflective foil coating. In particular, the compact disc 10 has three distinct regions, denoted as a center area 12, including a central opening 12a, a data area 14, and a perimeter or circumference area 16, including an outer circumferential wall 16a.

As shown in FIG. 2, the compact disc 10 comprises four distinct layers 18, 20, 22, and 24, each being generally circular and of the same diameter. The first layer 18 comprises a substrate formed of a clear polycarbonate plastic, the substrate having an upper surface 18a and a lower or outer surface 18b. Data in the form of microscopic pits and lands or bumps are formed, usually by stamping, on the top or upper surface 18a. These pits and bumps are miniscule (as short as 0.83 micrometer) and arranged in a spiral track (groove) winding from the disc's center hole 12a to its outer edge 16a. The pits and bumps define the information, which a laser (not shown) reads.

The second layer 20 is reflective sheet of foil that is applied to the upper surface 18b, covering the data thereon. The foil is typically a micro-thin metallic layer of aluminum or other metal such as copper, silver, or gold on higher quality CD's. The reflective foil layer 20 reflects the laser beam back through the plastic disc, allowing the stamped data to be read.

The third layer 22 is a layer of lacquer. The lacquer seals the reflective foil layer 20 and provides protection from oxidation.

Finally, a layer of ink is screened over the lacquer layer 22 to form the fourth layer 24. The ink layer 24 is for graphic purposes, but recordable CD's do not have this layer.

The metallic foil coating may be configured to store a wide variety and quantity of digital information which may be optically read through the use of one or more laser beams or other light amplified beams. A player (not shown) directs a laser beam upward, against the lower or outer surface 18b, and through the polycarbonate layer 18. The foil layer 20 reflects the laser beam back to the player, optical reader, or similar laser receptor.

As shown in FIG. 2, the outer surface 18b of the protective surface 18 is provided with a scratch 26, the cross-section of which is generally V-shaped. Scratches 26 can be hairline or knife-gouge in severity. Importantly, scratches 26 cause the laser beam to be deflected off of the scratch and away from the laser receptor. That is, the reflected beam is not perpendicular to the plane of the optical surface 18b, but at some angle thereto.

According to the invention herein there is provided a process and apparatus for removing the scratches 26 from the optical surface 18b of the compact disc 10. Turning to FIG. 3, an apparatus for removing scratches and other imperfections from the optical surface 18b of an optically read compact disc 10 is indicated by the number 28.

The scratch removing apparatus 28 comprises an annular support table 30, a convection heater 32, and a guide rail 34. The support table 30 supports the compact disc 10 in a manner that the scratched optical surface 18b is exposed and faces upwardly (i.e., in a first direction). The convection heater 32 is for heating and forcing heated air downwardly against the exposed surface, the air direction being perpendicular to a plane including the scratched surface 18b. The guide rail 34 supports and selectively positions the convection heater 32 above the disc 10 and in fixed spaced relation to the scratched surface 18b.

Preferably, the table 30, heater 32, and guide 34 are enclosed within a heat chamber 36 of an oven 37. The walls of the oven 37 are sealed against thermal change. Desirably, this enables the reconditioner (i.e., worker) to maintain an accurate control over the temperature to which the compact disc is subjected, wherein to make sure that the disc is not exposed to a temperature that exceeds a desired melting temperature (i.e., annealing temperature) of the material being reconditioned (as described hereinbelow).

The support table 30 is mounted for rotation about an axis "A" relative to the heat chamber 36 and includes a support surface 38 positioned in substantially a horizontal plane and formed with a circular disc cavity 40 sized to receive the compact disc 10. The disc cavity 40 has a circumferential wall 40a that is slightly greater than the outer circumferential wall 16a of the compact disc 10 to provide a clearance fit. Preferably, the disc cavity 40 is upwardly open and exposes the entire top layer of the optical surface 18b of the compact disc 10 when the compact disc is received therein.

A drive member 41 is provided for rotating the support table 30. The drive member 41 is not described in detail as being conventional and known by those skilled in the art. However, the drive member 41 is sufficient to rotate the support table 30 at high speed and generate centrifugal forces sufficient to initiate material reflow during heating of the polycarbonate layer 18 of the compact disc, the heating being above the annealing temperature of the polycarbonate material (described herein below).

In some applications, a vertical spindle 42 may be provided at the center of the disc cavity 40 for centering the compact disc 10 relative to the disc cavity. Such a spindle 42 would preferably have an outer diameter that is generally the same as, but slightly smaller diameter than, the diameter of the central opening 12a of the compact disc 10 wherein to provide a clearance fit therewith. Advantageously, the outer surface of the spindle 42 and the encircling circumferential wall 40a of the disc cavity 40 cooperate to inhibit unwanted distortion (i.e., unwanted change in diameter) of the compact disc 10 during simultaneous rotation of the support table 30 and heating of the compact disc by the convention heater 32.

The convection heater 32 is capable of heating a top layer 18c of the optical substrate 18 above the melting point or temperature (i.e., annealing temperature) of the polycarbonate material from which the first layer 18 is formed, thereby reflowing the material of the optical surface 18b so that scratches 26 and other imperfections are removed.

The convection heater 32 comprises a radiant heat source 44 for heating air passed thereover, a fan 46 for forcing air across the heat source 44, and a shaped housing 48 that encloses the heat source and discharges heated air towards the scratched surface 18*b*. The heat source 44 is conventional and may comprise bare, coiled nichrome wire(s) that are wrapped around an insulating mica board. Nichrome is suitable because the wire is a poor conductor of electricity (compared to copper), which gives the alloy enough resistance to get hot from high current flowing through it, and does not oxidize. The higher the wattage supplied to the heat source, the more power that is generated and transferred to heat the air.

The fan 46 is conventional and not described in great detail as being known to those skilled in the art. However, the fan 46 may comprise one or more axial flow fan impellers and a motor (not shown) for driving the impellers.

The housing 48 has a forward end in the form of a discharge outlet 50 for discharging heated air, which air was directed thereto by the fan 46. The discharge outlet 50 forms a relatively small nozzle-like opening that is designed to increase the velocity of heated air, indicated at 52, from the housing 48. Further, the discharge outlet 50 provides a narrow but precise stream of heated air that can be directed at the top melt layer 18*c* of the plastic material 18.

The guide rail 34 is provided in the chamber 36 for mounting the convection heater 32 vertically above the table 30. The guide rail 34 is arranged to position to discharge outlet 50 at a fixed vertical distance above the compact disc 10 when the disc is disposed in the disc cavity 40.

In operation, the guide rail 34 and the support table 30 maintain the scratched surface 18*b* of the compact disc 10 in a plane that is generally perpendicular to the direction of the heated air flow.

A drive member 49 is operably connected to the convection heater 32 to move the convection heater relative to the guide rail 34 and in an oscillating axial back and forth movement, above and across the optical surface 18*b* of the compact disc 10. The discharge outlet 50 moves in a plane that is parallel to and across the optical surface 18*b* of the compact disc 10, when the disc is mounted in the disc cavity 40.

Referring to FIG. 3, the discharge outlet 50 is shown as being moved axially relative to the guide rail 34, whereupon the discharge outlet 50 of the convection heater 32 is moved radially back and forth, relative to the center opening 12*a* and outer circumferential wall 16*a* of the compact disc 10. As shown in phantom, the convection heater 32A represents the axially inward position wherein the discharge outlet 50 is proximate to the center opening 12*a*, and the convection heater 32B represents the axially outward position wherein the discharge outlet 50 is proximate to the outer circumferential wall 16*a*.

An electronic controller (not shown as being known to those skilled in the art) is provided to simultaneously synchronize the rotational speed of the support table 30, as provided at least in part by the first drive member 41 thereof, and the axial position of the discharge outlet 50 of the convection heater 32 relative to the compact disc 10, as positioned at least in part by the second drive member 49, wherein to control the position of the heated air flow relative to the scratched surface of the compact disc.

Importantly, the electronic controller also monitors, sets and controls the temperature of the heat source 44 to a desired reflow heat, and the amount of time that the top melt layer 18*c* of the optical substrate 18 is exposed to the reflow heat that is generated by the heat source 44. Regulating the degree, amount, and time of exposure to heated air supplied from the convection heater ensures that the top melt layer 18*c* of the optical substrate 18 is exposed to a desired flow of heat energy.

Furthermore, exposure to heated convection air while simultaneously rotating the compact disc and oscillating the heated air source back and forth relative to the scratched surface of the compact disc ensures that the polycarbonate does not melt down or undergo drastic and non-uniform material melting during the refurbishing process. Also, by controlling the duration of time that the scratched surface is exposed to heated convection air ensures that a predetermined layer of the exposed scratched surface is uniformly heated and melted.

Further and according to this invention, a method (or process) for removing scratches and other imperfections from the optical surface 18*b* of an optically read compact disc 10 is provided, the optical surface of the compact disc including a laser penetrable plastic material 18. According to the method, the compact disc 10 is mounted in the disc receiving cavity 40, the mounting positioning the compact disc in a first plane and exposing a top melt layer 18*c* of the scratched optical surface 18*b*.

Then, the convection heater 32 is positioned in spaced relation above the optical surface 18*b*, the heater including the heat source 44 capable of generating a heat sufficient to heat the top layer 18*c* of the plastic material 18 of the optical surface 18*b* above its melting point, thereby reflowing the material of the melt layer 18*c* so that the optical surface is leveled by the reflow filling of the scratches and other imperfections.

The heat source 44 is heated to a temperature above the reflow temperature of the optical substrate 18.

The heated air is forced across the heat source 44 and downwardly towards the melt layer 18*c* of the optical surface 18*b*.

Thereafter, and substantially simultaneously, the convection heater 32 is moved a second plane, spaced above the first plane of the table 30, in an axial back and forth manner above the optical surface 18*b*, and the compact disc 10 is rotated, the heating and centrifugal forces of rotation causing the material of the top layer 18*c* of the optical surface 18*b* of the compact disc to reflow and the scratches 26 and other imperfections of the optical surface 18*b* to fill and the optical surface 18*b* to be smooth and substantially scratch free.

Preferably, the convection heater 32 is constrained for back and forth axial movement, and radially relative to the center opening 12*a* and outer circumferential wall 16*a* of the compact disc.

Preferably, the compact disc 10 is rotated at a rate such that centrifugal forces generated in such rotation and the heated air promote rapid and uniform leveling of the optical surface and filling of surface imperfections. The exposed portion of the compact disc is substantially uniformly exposed to the heated air during the time of rotation.

Preferably, following the exposure of the compact disc to heated convected air at the reflow temperature of the material forming the layer 18 of the compact disc, the disc is rotated for a further time, sufficient to gradually cool the optical material of the polycarbonate layer 18 and the material to set.

The cooling could be performed by a gradual, generally uniform, timed decrease in the rate at which the compact disc is rotated.

Preferably, the step of forcing air includes arranging the direction of air flow from the discharge outlet to be in a direction that is perpendicular to the plane of the compact disc.

Figure 4A:
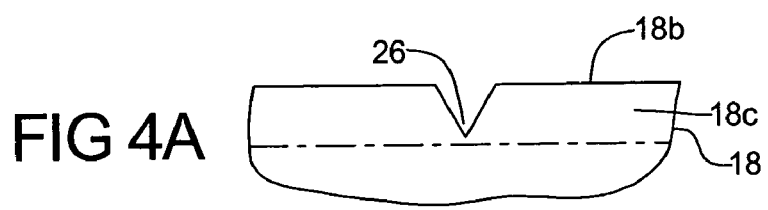
FIGS. 4A, 4B and 4C are detailed views, in section, showing the reconditioning process, progressing from the scratch in the protective coating shown in FIG. 2, during, and following the reconditioning
Figure 4B:
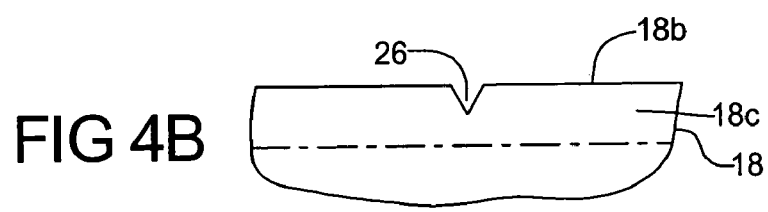
Figure 4C:

FIGS. 4A, 4B and 4C are detailed views, in section, showing the reconditioning process. FIG. 4A is an enlarged view of the scratch 26 to be removed from the optical surface 18b of the clear layer or optical substrate 18, such as shown in FIG. 2. As can be seen, the scratch 26 invades the top layer 18c of the optical substrate 18.

FIG. 4B illustrates the top layer 18c of the optical surface 18b following exposure to heated air 52. As can be seen, partial melting and reflow of the material has resulted in the top surface 18b leveling out and the scratch 26 closing.

FIG. 4C illustrates the optical surface 18b following the reconditioning.

While the present invention has been described with respect to specific embodiments, it will be understood that from the foregoing detailed description and accompanying drawings that various modifications and variations will occur to those skilled in the art. Such modifications and variations are intended to fall within the scope of the appended claims.

For example, in some applications involving minor scratches 26, the scratched optical surface 18b may be heated by a hand held heat gun. In this approach, the operator, or reconditioning technician, would position the heat gun above the support table 30 and rotate the compact disc 10. Simultaneous with the rotation of the compact disc, the operator would discharge heated air at the scratched surface 18b and move the heat gun back and forth, between the center 12a and outer circumference 16a of the disc 10. The operator would continue to apply heated air from the hand gun for a time sufficient for the heat to raise the temperature of the melt layer 18c to the needed melt temperature and the plastic material to reflow, thereby causing the optical surface 18b to level and the scratches therein to disappear.

I claim:

1. A system for removing scratches and other imperfections from the optical surface formed in the top layer of an optically read disc, comprising:
    a support table, said support table including a disc cavity sized to receive and encircle the outer circumference of the disc in a clearance fit and position the optical surface of said disc to face upwardly, said disc cavity being the sole means for mounting the disc,
    a convection heater for heating the top layer and optical surface of said disc to a predetermined temperature, the temperature being greater than the annealing temperature of said top layer and sufficient to cause the material to reflow so that said scratches and other imperfections of said optical surface refill with material of said top layer,
    means for positioning the optical surface and the convection heater in fixed axially spaced relation to one another,
    means for rotating the support table, and the disc therein,
    means for moving the convection heater alone a radius of the disc,
    a controller for substantially simultaneously rotating the support table and the disc therein relative to the convection heater and to a predetermined rotational speed, raising the temperature of the heater to a temperature above the annealing temperature of said top layer, controlling the duration of time that the optical surface is exposed to the heat, and moving the convection heater back and forth relative to a radius of the support table and across the optical surface of the disc.

2. The system as claimed in claim 1, wherein said convection heater comprises:
    an electrical radiant heat source,
    a housing enclosing the heat source, said housing including a discharge outlet for discharging and directing heated air from the heat source towards the disc, and
    means for forcing air across the heat source and from said discharge outlet, said means for forcing and said discharge outlet cooperating to direct heated air at a predetermined velocity and volume towards said optical surface.

3. The system as claimed in claim 1, wherein said disc cavity is generally cylindrical, cup-shaped, and includes a circumferential wall that is slightly greater than and provides a snug clearance fit with the outer circumference of the disc, said circumferential wall inhibiting unwanted change in diameter of the disc during simultaneous rotation of the support table and heating of the disc by the convection heater.

4. The system as claimed in claim 3, wherein said means for positioning includes:
    a guide rail for guiding the convection heater between a first position and a second position and along a radius of the disc, the convection heater being connected to the guide rail and maintained for movement in a plane generally parallel to the optical surface, the first position being proximate to the outer circumference of the disc and the second position being proximate to the spindle of the support table and center portion of the disc,
    said controller simultaneously moving the convection heater in a radial back and forth motion above the optical surface and between the first and second positions.

5. The system as claimed in claim 2, wherein the optical surface is in a first plane, the convection heater is mounted for movement in a second plane, said planes being in horizontal spaced relation to one another and the heated air is in a direction that is generally perpendicular to said first plane.

6. The system as claimed in claim 3, wherein
    said means for rotating includes a drive motor adapted to rotate the support table and the disc in the disc cavity thereof at a high rotational speed sufficient to generate a centrifugal force that will complement material reflow during heating of the disc.

7. The system as claimed in claim 1, further comprising a thermally insulated heat chamber, said disc and convection heater being enclosed within said chamber.

8. A method for removing scratches and other imperfections from an optical surface formed in the top layer of an optically read disc, wherein the top layer of said optical surface includes laser penetrable plastic material, comprising the steps of:
    mounting the disc in a disc receiving cavity and positioning the disc in a first plane, said mounting exposing the entire top surface of the disc including the optical surface thereof with said disc receiving cavity being the sole means for mounting the disc,
    positioning a convective heat source above said top surface including said optical surface and for movement in a second plane in substantially constant spaced apart relation above said first plane and alone a diameter of the disc, said heat source including a heater capable of generating a heat sufficient to heat the top layer of said disc and the scratched optical surface thereof above the melting point of the top layer, and
    providing a controller, the controller substantially simultaneously controlling the heating the heater of to a temperature above the melting temperature of the optical surface, forcing air across the heater and the air heated thereby onto the entire top surface including said optical surface, moving the heat source in a back and forth manner above and diametrically across at least a portion of the optical surface, and rotating the disc cavity and the disc in said disc cavity and wherein, the heated air and centrifugal forces from rotation cause the material forming the top layer to partially melt and reflow to fill any scratches and other imperfections in the optical surface the reflowing material of said top layer and the optical surface to be leveled by the reflow.

9. The method of claim 8, wherein the heat source is above the disc and constrained for back and forth radial movement between the center and circumference of the disc during rotation of the disc.

10. The method of claim 8, wherein the disc is rotated at a rate such that centrifugal forces generated in such rotation and said heated air promote rapid and uniform leveling of the optical surface and filling of surface imperfections.

11. The method of claim 10, wherein the exposed optical surface of the disc is exposed to heated air of a predetermined temperature during the time of rotation.

12. The method of claim 8, wherein following exposure of the optical surface to heated air for a predetermined time and temperature level sufficient for the heated air to initiate reflow of the disc material, the heated air flow is terminated and the disc is rotated for a further time sufficient to gradually cool the optical material and the material to set.

* * * * *